Jan. 23, 1951 W. B. SOBERS 2,539,336
WHEELED GOLF CLUB CARRIER
Filed May 24, 1946

INVENTOR.
Winfield B. Sobers,
BY
Morsell + Morsell
ATTORNEYS.

Patented Jan. 23, 1951

2,539,336

UNITED STATES PATENT OFFICE 2,539,336

WHEELED GOLF CLUB CARRIER

Winfield B. Sobers, Milwaukee, Wis.

Application May 24, 1946, Serial No. 672,050

4 Claims. (Cl. 280—53)

This invention relates to improvements in carts.

While the present invention may find utility generally in connection with the field of usage of transportation carts, it is particularly adapted for use as a golf club cart to enable a player to easily transport his clubs and paraphernalia over a golf course instead of employing a caddy.

A general object of the invention is to provide a two-wheeled cart wherein the frame is formed of light metal tubing with the lower or forward end portions thereof bent into substantial U-formation to spacedly underlie the major extent of the frame, providing integral wheel-carrying axle studs and an equipment supporting platform engageable with the ground to hold the major extent of the frame in an inclined accessible position when the cart is at rest.

A further object of the invention is to provide a two-wheeled cart wherein integral tubular frame members are so shaped as to provide an undercarriage for the wheels, the same being resilient or yieldable for the purpose of absorbing bumps and shocks.

A further object of the invention is to provide a two-wheeled golf club cart having an extended frame portion which, when the cart is at rest, is self-supported in an upwardly directed angular position, holding the golf clubs in a very accessible position for easy reach by the player.

A further object of the invention is to provide a golf cart arranged for the convenient transportation of different classes of golf clubs in properly segregated relation, facilitating their selection for use, certain of the golf club heads being supported against cushioned rods.

A further object of the inventon is to provide a cart of the character described having an open frame, which, besides being light, prevents the accumulation of dirt and water.

A further object of the invention is to provide a transportable cart of light, compact and durable construction, which is conveniently arranged and balanced for easy propulsion or for standing at rest in an accessible position, which securely mounts for transportation in a convenient accessible manner such articles as different classes of golf clubs and paraphernalia, which is strong and durable, and which is well adapted for the purposes described.

With the above and other objects in view, the invention consists of the improved cart, and its parts and combinations as set forth in the claims, and all equivalents thereof.

In the accompanying drawing in which the same reference characters indicate the same parts in all of the views.

Figure 1:
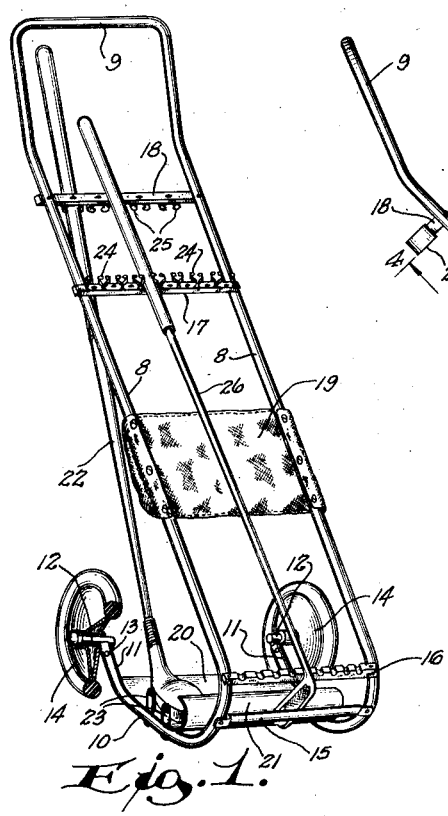
Fig. 1 is a front and side perspective view of the improved cart with a part broken away and in section to show structural details.

The frame of the improved cart is of open formation and is generally formed of an extent of aluminum tubing or other light metal bent into the form best shown in Fig. 1. As thus shaped, the frame includes a pair of spaced rectilinear portions 8 connected at their upper rear end portions by a U-shaped extent 9 bent slightly out of the plane of the portions 8 to provide a handle. The forward lower end portions of the members 8 are curved into substantially U-formation inwardly and rearwardly to provide an undercarriage 10, the major extent of which is at an acute angle to the portions 8 for the purpose of resting on the ground or engaged surface when the cart is at rest. The rear extremities of the frame portions of the undercarriage 10 are angled upwardly, as at 11, and telescopically receive the shank portions of angular axle rods 12 which are secured by means of rivets 13. The outer ends of the axle rods 12 are angled laterally outwardly, as shown in Fig. 1, and have revolubly mounted thereon wheels 14.

Figure 2:
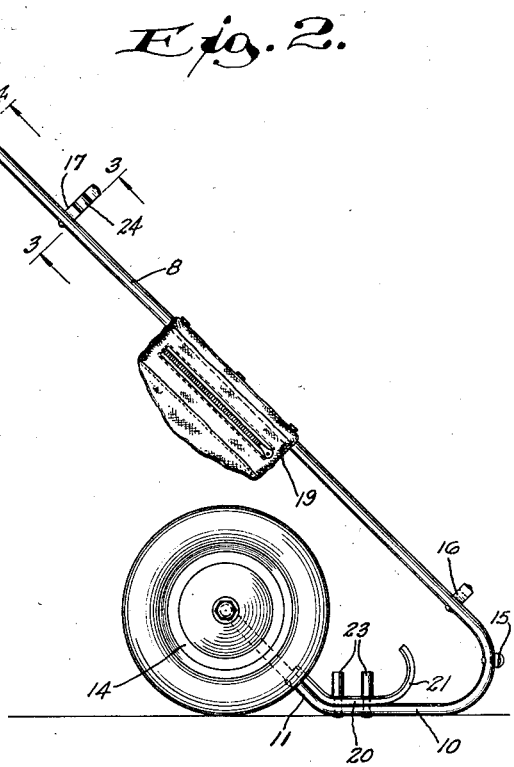
Fig. 2 is an enlarged side view of the improved cart in its balanced position of rest.

The curved forward nose portions of the frame members 8 are connected and braced by a transverse rubber covered bar 15. Additionally, there is extended between the members 8, spaced slightly above the bar 15, a transverse grooved support 16, and substantially rearwardly removed from the support 16 there are mounted transversely across the members 8 spaced supports 17 and 18. The supports 16 and 17 are mounted on the upper or outer surfaces of the members 8, while the support 18 is mounted on the undersurface of the members 8. Besides spacedly connecting and bracing the frame members 8, all of the members 15, 16, 17 and 18 are arranged for article supporting purposes as will hereinafter appear. The frame members 8 also support opposite side marginal portions of a fabric bag or pocketed member 19, preferably arranged as illustrated. The member 19 may take any desired form and access to the interior pockets thereof may be controlled by suitable closure devices such as the "zipper" fastener shown in Fig. 2. Said member 19 may have stored therein accessories and paraphernalia such as golf balls, tees, sweaters, etc.

The frame portions of the undercarriage 10 carry and are spanned by a sheet metal deck 20 whose forward end portion is spaced from the turned forward nose portions of the frame elements and is curved to form a protective cowl 21. The exposed surface of the entire deck, including the cowl, may carry a sheet rubber covering to protect articles resting thereon. Essentially, the deck 20 forms a support for the heads of golf club "woods" 22 which may be arranged in the manner shown in Fig. 1 so that the heads thereof rest flatly on the deck, projecting below the curved cowl 21 for protective and retention purposes. Upstanding padded pins 23 adjacent the side margins of the deck 20 additionally serve to locate the heads of the golf clubs thereon and prevent lateral displacement. These pins extend through the deck and frame portions of the undercarriage and serve as the means for securing the deck to the undercarriage. Said deck also serves the purpose of bracing and reinforcing the undercarriage frame.

Figure 3:
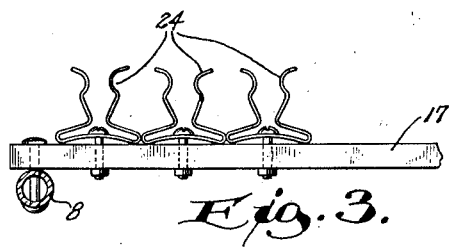
Fig. 3 is a transverse, fragmentary, detail sectional view taken on line 3—3 of Fig. 2 and on a larger scale.
Figure 4:
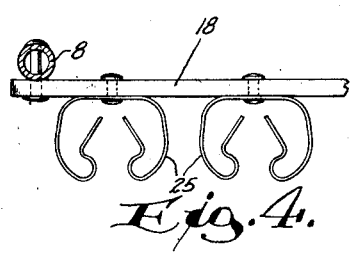
Fig. 4 is an enlarged, transverse, fragmentary detail sectional view taken on line 4—4 of Fig. 2.
Figure 5:
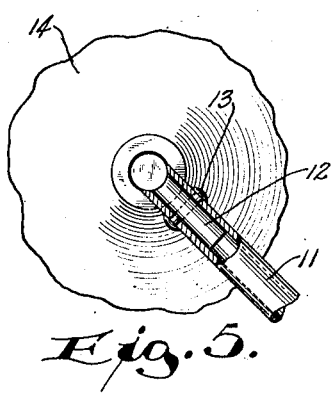
Fig. 5 is an enlarged fragmentary detail view, with parts broken away and in section, to show the manner in which a wheel is mounted.

The transverse support 17 has bolted thereto a series of outwardly or upwardly opening yielding clips 24. The transverse support 18 has bolted thereto downwardly projecting and opening spring clips 25, it being noted that the spring clips 25 are of somewhat different construction than the spring clips 24, as shown in Figs. 3 and 4, and are better suited for the retention of the shafts of clubs 22 disposed on the underside of the frame 18.

When used for the convenient transportation of golf clubs and paraphernalia, the improved cart may be loaded in the manner shown in Fig. 1, it being understood that only one club of the "iron" type is shown on one side of the cart and only one club of the "wood" type is shown on the other side of the cart, and in practice, the cart is readily loaded with series of such classes of golf clubs. The iron clubs 26 are carried in spaced or segregated relation by the top or outer surface of the frame elements of the cart and the shafts spacedly lie on the supports 17 and 16 with separated portions of the shafts being engaged by the spring clips 24 and the grooves or recesses in the support 16. The heads of the clubs 26 are turned downwardly or inwardly and lodge between the curved outer surface of the cowl 21 and the cushioned rod 15, actually resting on the latter. The clubs of the "wood" class are disposed in the manner previously suggested in spaced relation on the undersurface of the cart and the outer ends of the shanks of such clubs 22 are embraced by the spring clips 25. The spaced mounting of all of the clubs prevents injurious abrasion as between the same.

The improved cart is so designed that in either its loaded or unloaded condition the major part of its weight is below or forwardly of the axis of pivotal mounting of the frame on the wheels 14. Hence, unless a downward manual pressure is imposed on the handle 19, the cart when it rests, will assume the position shown in Figs. 1 and 2 wherein the major extent of the frame is extended upwardly at an acute angle relative to horizontal and the portions 10 of the undercarriage rest on the ground or surface. This position of the cart renders it very easy to load and unload and holds the golf clubs in a natural, head down, hitting position for selection, removal and replacement by the player. In propelling the cart, its balance is such that a minimum amount of pressure is required on the handle 9 in a downward direction to tilt the major extent of the frame with the frame then pivoting on the wheels and removing the undercarriage portions 10 from engagement with the ground. Then the cart may be easily pushed or pulled over the ground.

It is, of course, obvious that the light weight frame construction of the cart renders the same easy to propel and transport and to lift and handle. As the cart is entirely open save for the flat deck 20, dirt will not accumulate on any surfaces, nor are there pockets for the accumulation of water and moisture. The one piece frame construction renders the cart easy to fabricate and the rear ends of the undercarriage receive the angular axle rods 12, providing a simple wheel mounting which does not require a complete transverse axle which might obstruct the undercarriage and interfere with removal and replacement of clubs by the player.

The underturned portion of the frame which forms the undercarriage has inherent resiliency of a true knee spring action and facilitates the absorbing of bumps and shocks during transportation of the cart.

The improved cart is furthermore of simple and novel construction, is unique and attractive in appearance, and is well adapted for the purposes described.

What is claimed as the invention is:

1. A transportable golf cart, comprising a pair of spaced, elongated, rectilinear side bars, integral undercarriage elements extending angularly rearwardly from the forward ends of said side bars, a transverse handle connecting the rear ends of said side bars, axle studs projecting laterally from the free ends of the undercarriage elements, a wheel revolubly mounted on each axle stud, a pan carried by said undercarriage members, a padded, transverse bar at the forward ends of the side bars, transverse load supports spacedly carried by opposite faces of the side bars, said supports having series of yielding clips thereon, and a rack carried transversely by the forward ends of the side bars spaced rearwardly of the padded bar and forming therewith a pocket for the heads of golf clubs engaged by the rack and one of said load supports, another load support cooperating with the pan for the mounting of other golf clubs.

2. A transportable golf cart, comprising a pair of spaced, elongated, rectilinear side bars, undercarriage elements extending angularly rearwardly from the forward ends of said side bars, a handle at the rear ends of said side bars, wheels revolubly carried by the free ends of said undercarriage elements, a pan carried by said undercarriage elements forwardly of the wheels, a transverse bar at the forward ends of the side bars, transverse load supports spacedly carried by the side bars, and a rack carried transversely by the forward ends of the side bars spaced rearwardly of the transverse bar and forming therewith a pocket for the heads of golf clubs engaged by the rack and one of said load supports, another load support being formed with golf club engaging means and cooperating with the pan for the mounting of other golf clubs.

3. A golf cart comprising spaced side members of metal tubing having return bends at their lower forward ends to provide integral undercarriage sections extending rearwardly from said forward ends and forming an acute angle therewith, the rear extremities of said undercarriage sections being angled upwardly relative to the major extents of the undercarriage sections, wheels revolubly mounted on the rear portions of said under carriage section extremities, portions of said under carriage sections forwardly of said wheels being adapted to engage the ground when the cart is at rest, the angle of the side members with respect to the under carriage sections and the length of said side members being such that a major portion of their length projects rearwardly beyond the wheels when the under carriage is thus at rest on the ground, club supporting means connecting the rearwardly projecting portions of said side members, and cooperating club supporting means connecting said under carriage sections, the center of gravity of the cart being so located as to maintain the undercarriage sections in contact with the ground when the cart is at rest on a line with the lower peripheral portions of the wheels and while the side members are projecting upwardly and rearwardly, the return bends being the sole connection between the side members and under carriage and being relatively gradual and rounded to render said connection yielding.

4. A golf cart, comprising spaced side members having return bends at their lower forward ends to provide integral undercarriage sections extending rearwardly from said forward ends and forming an acute angle therewith, the rear extremities of said undercarriage sections being angled upwardly relative to the major extents of the undercarriage sections, wheels revolubly mounted on the rear portions of said undercarriage section extremities, portions of said under carriage sections forwardly of said wheels being adapted to engage the ground when the cart is at rest on a line with the lower peripheral portions of the wheels, the angle of the side members with respect to the undercarriage sections and the length of said side members being such that a major portion of their length projects rearwardly beyond the wheels when the undercarriage is thus at rest on the ground, club supporting means carried by portions of side members, and cooperating club supporting means carried by said undercarriage sections, the center of gravity of the cart being so located as to maintain the undercarriage sections in contact with the ground when the cart is at rest and while the side members are projecting upwardly and rearwardly, the return bends being the sole connection between the side members and the undercarriage and being relatively gradual and rounded.

WINFIELD B. SOBERS.

REFERENCES CITED

The following references are of record in the file of this patent:

UNITED STATES PATENTS

| Number | Name | Date |
|---|---|---|
| 1,168,946 | Leo | Jan. 18, 1916 |
| 1,486,655 | Gourley | Mar. 11, 1924 |
| 2,131,673 | Robinson | Sept. 27, 1938 |
| 2,262,298 | Proctor | Nov. 11, 1941 |
| 2,313,868 | Garlinghouse | Mar. 16, 1943 |
| 2,411,965 | Hartung | Dec. 3, 1946 |

FOREIGN PATENTS

| Number | Country | Date |
|---|---|---|
| 380,411 | Great Britain | Sept. 15, 1932 |
| 804,243 | France | Oct. 19, 1936 |